United States Patent [19]
Kreitzberg

[11] Patent Number: 5,953,975
[45] Date of Patent: Sep. 21, 1999

[54] MACHINE FOR POSITIONING AND CUTTING TREE TRUNKS

[76] Inventor: Brian A. Kreitzberg, 14669 S. Doris Ave., Lake Oswego, Oreg. 97035

[21] Appl. No.: 08/795,797

[22] Filed: Feb. 5, 1997

[51] Int. Cl.⁶ .................................................. B27B 5/18
[52] U.S. Cl. .................... 83/397; 83/468.1; 83/468.2; 83/468.7; 83/478; 83/490; 83/574; 144/286.5
[58] Field of Search .................................. 83/467.1, 468, 83/468.1, 468.2, 468.5, 468.6, 468.7, 468.9, 468.94, 471, 490, 574, 397, 478; 144/4.1, 34.1

[56] References Cited

U.S. PATENT DOCUMENTS

| | | | |
|---|---|---|---|
| 4,123,957 | 11/1978 | Niemela | 83/796 |
| 4,215,612 | 8/1980 | Peel | 83/490 X |
| 4,557,170 | 12/1985 | Ingham | 83/468 |
| 4,987,935 | 1/1991 | Corcoran et al. | 144/34.1 |
| 4,998,573 | 3/1991 | York | 83/490 X |

*Primary Examiner*—Clark F. Dexter
*Attorney, Agent, or Firm*—James D. Givnan, Jr.

[57] ABSTRACT

A table structure of the machine includes a table top defining an open area through which the trunk of a small tree may extend to enable lateral abutment of the lower trunk against an edge of the table top. A second or elevated abutment is carried on a post for engagement with an upper end segment of the tree trunk to position the trunk in an upright manner for subsequent cutting off of the trunk base. A circular power saw is swingably mounted on the table structure and swings about an axis during a trunk cutting operation. A saw carrier is spring biased so as to disengage the saw from the trunk being cut. A blade guard of the saw is automatically retracted by a tether to expose the saw blade during a cutting operation and oppositely to conceal the blade when retracted away from the tree trunk.

5 Claims, 2 Drawing Sheets

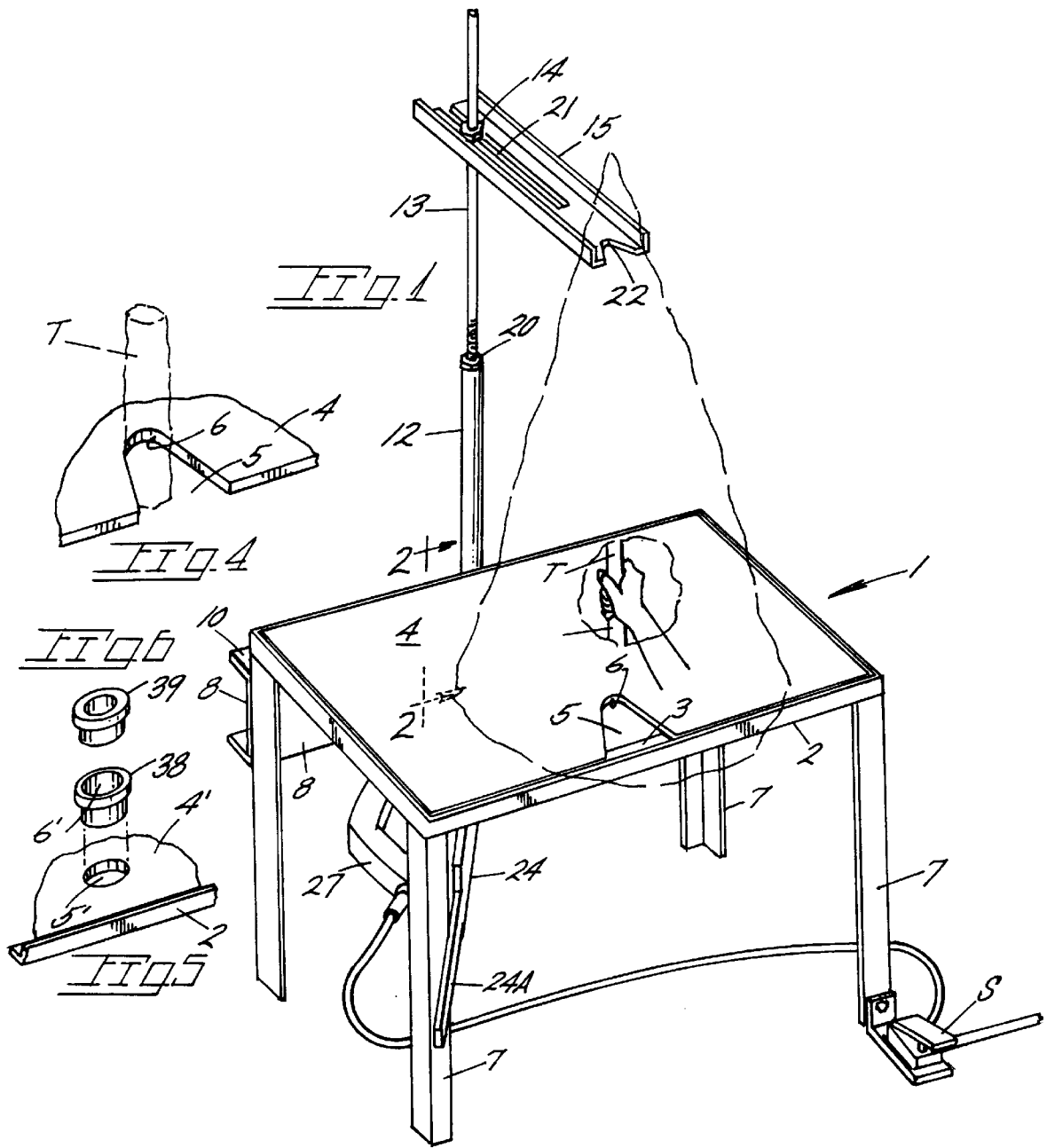

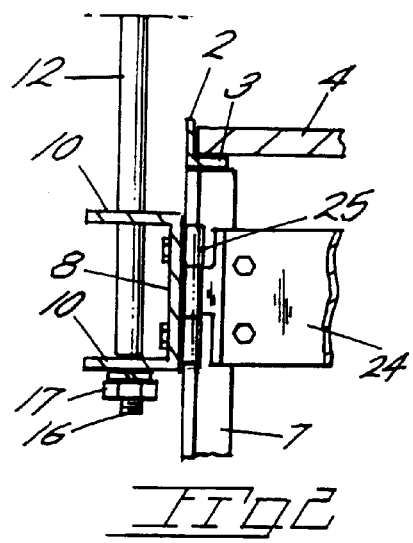
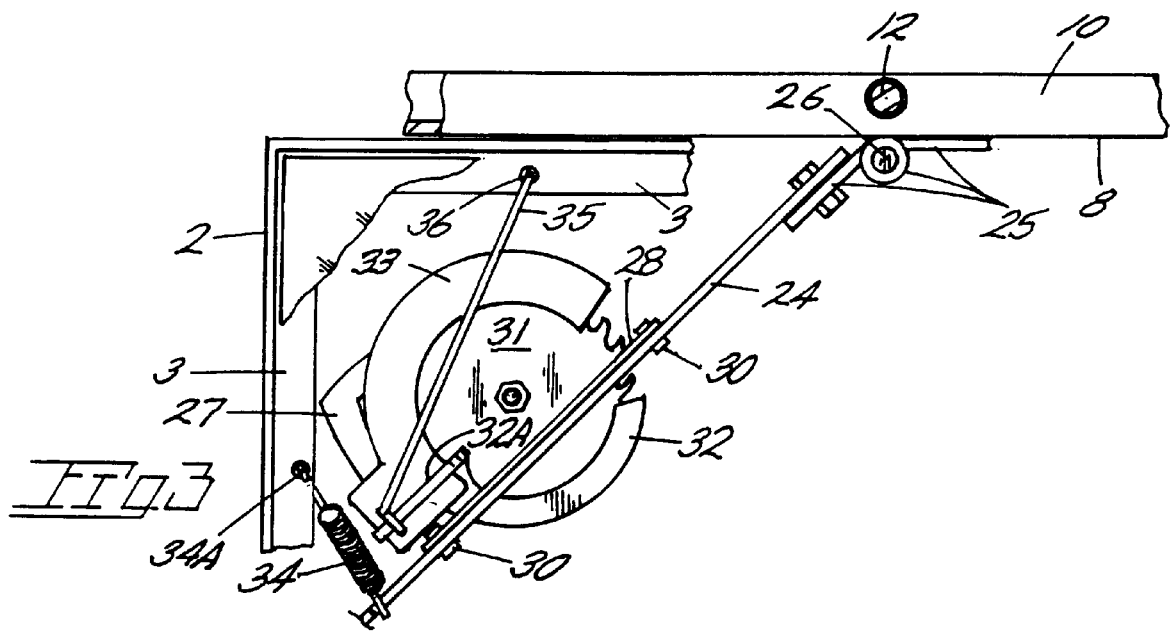

MACHINE FOR POSITIONING AND CUTTING TREE TRUNKS

BACKGROUND OF THE INVENTION

The present invention pertains generally to jigs and machines which facilitate momentary manual positioning of an elongate article and thereafter cutting of the article along a path perpendicular to the axis of the article.

For installation of a Christmas tree on a stand, or other support, it is important that the trunk is severed along a plane perpendicular to the trunk to ensure the tree being supported in the vertical. Reliance on "eyeballing" during such cutting of the trunk often results in the cut surface being other than perpendicular to the tree axis with the stand supported tree being other than vertical.

It has been determined that retailers of Christmas trees greatly enhance the volume of sales when the trees are sold installed in a low cost stand.

U.S. Pat. No. 4,123,957 discloses an apparatus for transverse cutting of a log by a chain saw mounted for travel in a plane normal to the log axis. The saw blade is spring biased to a rest position. A workpiece or log rests on inclined surfaces and against stops. It is not believed that such an apparatus could precisely position and retain a Christmas tree in view of branch contact with the supports.

U.S. Pat. No. 4,557,170 discloses the use of the cut-off saw in place on an horizontal support of elongate configuration with provision made for measuring the horizontal distance between a saw blade and a selected point on the horizontal support. Again, it is not believed the device could conveniently and accurately sever Christmas tree trunks in a plane perpendicular to the trunk axis.

SUMMARY OF THE PRESENT INVENTION

The present invention is embodied within a machine in which the article to be cut may be rapidly positioned in place and the base cut in perpendicular fashion and the tree removed all within a matter of a few seconds.

A table structure of the machine includes a tree engaged edge suface against which the lower segment of a tree trunk is abutted while an upper segment of the trunk is similarly urged into contact with an elevated edge surface. The tree is accordingly properly located perpendicular to the path of a table mounted power saw blade to permit the user to rapidly trim the tree trunk. Provision is made for handling a range of tree trunk diameters and tree heights. An elevated arm member is positionable relative a table supported post to enable adjustment to accommodate a range of tree sizes.

Important objectives include the provision of a machine enabling the rapid trimming of a tree trunk along a surface perpendicular to the trunk axis in a few seconds; the provision of a machine having components which may be substituted for one another to accommodate a range of tree trunks while the tree or other article is manually urged into engagement with edge surfaces of the machine ensuring precise positioning of the article being cut; the provision of a machine for cutting of elongate articles such as Christmas trees utilizing a conventional portable circular power saw having a positionable guard retracted by restraint means during cutting of a tree trunk.

BRIEF DESCRIPTION OF THE DRAWINGS

In the accompanying drawings:

FIG. 1 is a perspective view of the present machine;

FIG. 2 is a vertical sectional view taken along line 2—2 of FIG. 1;

FIG. 3 is a fragmentary plan view of the table shown in FIG. 1 with parts broken away to disclose a saw carrier and saw; and FIG. 4 is an enlarged fragmentary perspective view of a cutout area of a table top member with a tree trunk shown in dashed lines.

FIG. 5 is a fragmentary perspective view of a modified form of a table top.

DETAILED DESCRIPTION OF THE PREFERRED EMBODIMENTS

With continuing attention to the drawings, wherein applied reference numerals indicate parts similarly hereinafter identified, the reference numeral 1 indicates generally a table structure which may include a frame 2 of welded angle iron with an inner perimeter provided by an angle iron flange 3 serving to support a table top 4.

With continuing attention to table 1, a cutout area 5 in top 4 is partially defined by a tree engaging edge 6 which is abutted by the article being worked on, as for example, the trunk T of a Christmas tree shown in phantom lines. Table legs 7 support the corners of frame 2 and additionally a cross member 8 which may be of channel section with flanges at 10.

A post structure 12 of the table structure includes an extension 13, a portion of which is threaded to receive nut elements as at 14 to support an arm 15. The flanges 10 of table mounted cross member 8 are bored to receive post structure 12 with a downwardly directed, threaded stud 16 receiving a nut 17 to secure the post to lowermost flange 10. A nut at 20 permits axial adjustment of post extension 13. Arm 15 is slotted at 21 to permit horizontal adjustment of the arm to enable positioning of an edge 22 formed in the outer end position of the arm. Accordingly, tree trunk T, when manually postioned as shown, will be perpendicular to table top member 4 with its lower portion in place against stop 6 and with the upper portion of the trunk in place against edge 22 the multiple stop surfaces.

A saw carrier at 24 is of plate configuration and carried by a hinge 25 which in turn is mounted in place on table cross member 8. A hinge pivot pin is at 26. A circular saw 27 is preferably of the portable type and includes a foot plate 28 suitably secured to carrier 24 by fasteners at 30. A saw blade 31 is partially enclosed by a retractable guard 32 which is retractable into a blade housing 33 of saw 27, a feature typical of most portable circular saws. Saw carrier 24 is spring biased by an extension spring 34 coupled at 34A to table structure 1 to return saw 27 to the inoperable position shown in FIG. 3. During a cutting operation, a handle 24A of saw carrier 24 is grasped by the operator to swing saw blade 31 into contact with the lowermost segment of tree trunk T positioned per FIG. 1. A tether at 35 is attached at 36 to the table and at a remaining end to a guard appendage 32A to restrain guard movement during manual positioning of saw carrier 24 to retract guard 32 into housing 33 during blade contact with the tree trunk. Return of carrier 24 and saw 27 to the position shown in FIG. 3 permits automatic repositioning or return of the guard by internal saw components in accordance with typical circular saw construction.

The utilization of both of the user's hands, i.e., in supporting trunk T in position for cutting and in grasping of handle 24A assures avoidance of contact with saw blade 31 with the person.

The multiple tree trunk engageable surfaces of 6 and 22 are preferably of convergent configuration to position trees throughout a range of trunk cross sectional sizes. If desired, table top member 4, in rested engagement with table frame 2, may be lifted out and a substitute top member installed to provide an alternatively shaped edge for other tree trunk sizes.

In FIG. 5, rings at 38 and 39 have the same external dimension to interchangeably fit in a modified table top 4' having an opening or area 5' of like dimension. The rings have different internal diameters for reception of tree trunks of different diameter for retention against shifting. Upper arm 15 is positionable upon adjustment of the post extension and laterally by reason of arm slot 21 to accommodate various tree sizes. Adjustment of apparatus parts would be infrequent as Christmas trees are typically handled in batches of the same size. The edges or stops 22 and 6 are of upper and lower dimension to ensure lateral abutment with the tree trunk without obstruction by tree branches.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A machine facilitating positioning and cutting the trunk of a manually positioned tree in a plane perpendicular to the trunk axis, said machine comprising, a table including a table top having a first stop surface against which a first segment of the tree trunk may be manually abutted and held in place by the user, a support means carried by the table, an arm on said support means, said arm disposed in an upwardly spaced relationship to said first stop surface and including a second stop surface against which a second segment of the tree trunk may be simultaneously manually abutted, said first stop surface and said second stop surface being substantially in alignment in a direction generally perpendicular to said table top to position the axis of the tree trunk in an upright manner, and a saw carrier swingably mounted to said table beneath said table top, and a power saw disposed on said saw carrier and having a blade for travel in a plane defined by said saw carrier to sever the tree trunk, wherein said plane is subjacent said first stop surface and substantially perpendicular to the first stop surface.

2. The machine claimed in claim 1 wherein said first stop surface is an edge of the table top defining an open area in the table top through which a tree trunk may extend.

3. The machine claimed in claim 1 wherein said arm includes means for varying the distance between said first stop surface and said second stop surface to accommodate trees of different sizes.

4. The machine claimed in claim 1 wherein said power saw includes a retractable blade guard, and restraint means acting on said guard to restrain said guard during saw travel.

5. The machine claimed in claim 4 wherein said restraint means is a tether carried by said table and coupled to said blade guard.

* * * * *